(No Model.)

H. C. HAM.
SHOVEL STANDARD FOR CULTIVATORS.

No. 554,928. Patented Feb. 18, 1896.

Witnesses
George Heidman
Harvey G. Edwards

Inventor
Henry C. Ham
by Stern & Allen
Attys

UNITED STATES PATENT OFFICE.

HENRY C. HAM, OF LIBERTY, INDIANA, ASSIGNOR TO THE RUDE BROTHERS MANUFACTURING COMPANY, OF SAME PLACE.

SHOVEL-STANDARD FOR CULTIVATORS.

SPECIFICATION forming part of Letters Patent No. 554,928, dated February 18, 1896.

Application filed December 19, 1895. Serial No. 572,283. (No model.)

*To all whom it may concern:*

Be it known that I, HENRY C. HAM, a citizen of the United States, residing at Liberty, in the county of Union and State of Indiana, have invented certain new and useful Improvements in Shovel-Standards for Cultivators, of which the following is a full, clear, and exact description, reference being had to the accompanying drawings, forming part of this specification.

My invention relates to what is known as "spring-trip attachments" for shovel-standards in cultivators, the purpose of which is to supply a yielding connection between the shovel and its shank to allow the shovel to be bent back when meeting any unusual obstruction and to permit it to automatically free itself from such obstructions. To accomplish this, it has been customary to pivot the shovel-lever to its shank and provide a spring connection so that when the shovel has been thrown back upon meeting the obstruction the spring will at once throw the shovel forward into its normal position. In order, however, that the ordinary action of the ground as the cultivator is advanced shall not cause the shovel to be broken back, it is necessary to provide quite a powerful spring, and as the spring is still further compressed when the shovel is bent back and still greater power is brought to bear the result with the usual constructions is that the shovel is thrown violently forward, scattering the dirt and racking the cultivator. It is to overcome these objections that my invention is directed; and it consists in applying the spring-pressure so that when the shovel is bent back the action of the spring will be at a much more obtuse angle, whereby the force of the spring may be somewhat weakened, and so that the tension of the spring may be regulated to hold the shovel under ordinary conditions in its normal position and still when the shovel is bent back the action of the spring will not be so great as to tear the ground or rack the machine.

Figure 1:
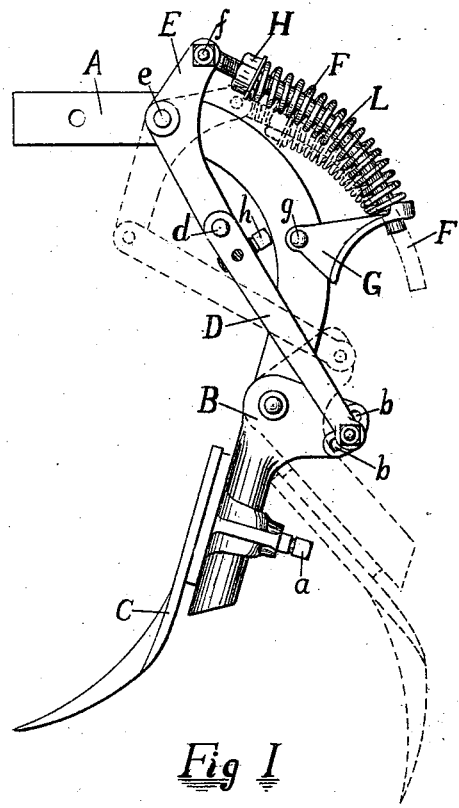
Figure 2:
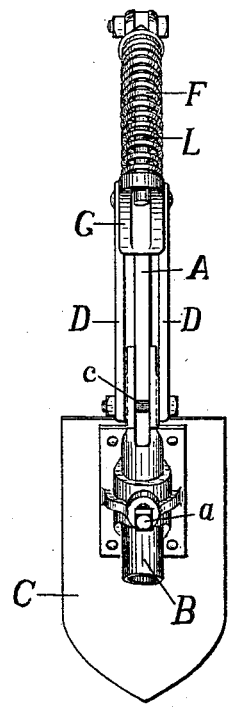
Figure 3:
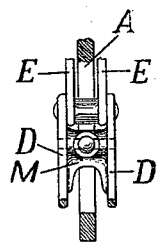
Figure 4:
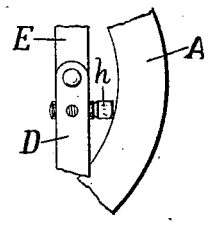

In the drawings, Figure 1 is a side elevation of the cultivator-standard embodying my improvements. Fig. 2 is a rear elevation of same, and Figs. 3 and 4 are front and side views of the pivot-adjusting screw.

A is the shank or standard for supporting the shovels, which is secured to the cultivator beam or cross-head in the usual way. Pivoted at the base of this shank is the shovel-lever B, upon which the shovel C is mounted, the shovel being adjustable on the lever by the set-screw $a$. The heel of the shovel-lever B is provided with a series of holes $b\ b$, in one of which are pivoted by the bolt $c$ the two parallel connecting-bars D D. Coupled to these connecting-bars at $d$ is a pair of crank-levers E, which are pivoted at $e$ at the upper end of the shank A.

F is a rod slightly curved, which is pivoted to the upper outer end of the crank-levers E E by the bolt $f$. The lower end of this rod plays through an opening in a bracket G, secured to the shank at $g$.

H is a nut mounted on the upper end of the rod F, and L is a coiled spring bearing between this nut H and the upper face of the bracket G. The nut H is adjustable along the rod F, so that the tension of this coiled spring can be regulated as desired. Between the upper ends of the connecting-bars D is secured a block M, which block is provided with a set-screw $h$, the head of which bears against the inner curve of the shank A, and by means of which the angle of the levers can be adjusted.

The shovel-lever B is provided with a series of holes $b$, in order to adjust the position of the shovel.

When in its forward movement the shovel strikes some unusual obstruction, the shovel will be bent back into the position shown in the dotted lines in Fig. 1, compressing the coiled spring L and at the same time changing the angle of its bearing against the bracket G, and also bringing the coupling-point of the rod F with the crank-levers E almost in a line with the pivotal point $e$ of these levers and the outer end of the bracket G. With this construction, therefore, it will be seen that although the spring L is compressed the force exerted on the crank-levers to return the shovel to its normal position is much less than it would be if the entire force of the spring were acting directly on the ends of these levers, and with this construction the shovels are not reset with such force as to wreck or rack the gangs or to throw the earth or clods forward on the team.

Having thus described my invention, what I claim, and desire to secure by Letters Patent, is—

1. In a cultivator, the combination, with the shovel-shank and shovel-lever pivoted thereto, of a crank-lever pivoted to the upper portion of said shank, with its arms extending above and below the same, connecting-bars coupling the lower end of said crank-lever with said shovel-lever, bracket extending out from the rear of said shank between the pivotal points of the two levers, with spring bearing between said bracket and the outer upper end of said crank-lever, whereby the bending back of the shovel will change the point of application of the power of said spring, substantially as shown and described.

2. In a cultivator, the combination, with the shovel-shank and shovel-lever pivoted thereto, of a crank-lever pivoted to the upper portion of said shank, with its arms extending above and below the same, connecting-bars coupling the lower end of said crank-lever with said shovel-lever, rod pivoted to the upper outer end of said crank-lever, bracket for supporting said rod, with coiled spring on said rod bearing between said bracket and said crank-lever, whereby the bending back of the shovel will change the point of application of the power of said spring, substantially as shown and described.

HENRY C. HAM.

Witnesses:
J. H. DAVIS,
HERBERT DARR.